(12) United States Patent
Suarez

(10) Patent No.: US 11,297,023 B2
(45) Date of Patent: Apr. 5, 2022

(54) DISTRIBUTED MESSAGING AGGREGATION AND RESPONSE

(71) Applicant: PUSHR TECHNOLOGY, INC., Seattle, WA (US)

(72) Inventor: Anthony Joseph Suarez, Seattle, WA (US)

(73) Assignee: PEAKIO, INC., Seattle, WA (US)

( * ) Notice: Subject to any disclaimer, the term of this patent is extended or adjusted under 35 U.S.C. 154(b) by 547 days.

(21) Appl. No.: 16/411,147

(22) Filed: May 14, 2019

(65) Prior Publication Data

US 2020/0366633 A1   Nov. 19, 2020

(51) Int. Cl.
| | | |
|---|---|---|
| H04L 29/06 | (2006.01) | |
| H04L 51/00 | (2022.01) | |
| G06N 3/04 | (2006.01) | |
| G06F 16/22 | (2019.01) | |

(52) U.S. Cl.
CPC .............. *H04L 51/14* (2013.01); *G06F 16/22* (2019.01); *G06N 3/04* (2013.01); *H04L 63/08* (2013.01)

(58) Field of Classification Search
CPC ....... H04L 51/14; H04L 51/046; H04L 51/32; H04L 63/08; G06F 10/22; G06N 3/04
See application file for complete search history.

(56) References Cited

U.S. PATENT DOCUMENTS

| | | | | |
|---|---|---|---|---|
| 9,461,897 | B1 * | 10/2016 | Babcock | ................. H04L 51/26 |
| 10,078,750 | B1 * | 9/2018 | Oliver | ..................... H04L 51/32 |
| 10,303,762 | B2 * | 5/2019 | Markman | ............... G06F 40/30 |
| 2009/0313684 | A1 * | 12/2009 | Shah | ..................... G06F 21/335 726/7 |
| 2013/0275504 | A1 * | 10/2013 | Patel | ..................... G06Q 10/10 709/204 |
| 2014/0222478 | A1 * | 8/2014 | Wang | ..................... G06Q 50/01 705/7.13 |
| 2019/0058721 | A1 * | 2/2019 | Cullison | ............. H04L 63/1425 |
| 2021/0152655 | A1 * | 5/2021 | Sarukkai | ................. H04L 63/08 |

* cited by examiner

*Primary Examiner* — Chau Le
(74) *Attorney, Agent, or Firm* — Donald J. Lenkszus

(57) ABSTRACT

A method of providing a distributed messaging system to aggregate particular types of messages regarding a client from customers of said client and for generating response and informational messages to the customers is provided. The method is performed in a distributed system comprising one or more processors executing computer instructions and one or more non-transitory computer readable media with computer executable instructions stored thereon executed by the one or more processors to provide the method. The method comprises the steps of: receiving and securely storing client account credentials of the client for a group of client determined user accounts comprising predetermined ones of social media and email accounts of the client; utilizing the client account credentials to access the user accounts; capturing all customer messages received at the user accounts; filtering all the captured messages for predetermined keywords; aggregating the filtered customer messages in a database; and determining severity, trust and validity of the filtered customer messages.

19 Claims, 4 Drawing Sheets

DISTRIBUTED MESSAGING AGGREGATION AND RESPONSE

FIELD OF THE INVENTION

The present invention relates to automated messaging systems, in general, and to a system and method for automatically collecting messages on social media platforms, identifying services issues in said messages, generating status responses to said messages utilizing message templates, automating an approval chain for approving and iterating said response messages, and automating publishing response messages.

BACKGROUND

Any business that provides a service has a responsibility to inform its customers of service outages, planned or unplanned. In many businesses, a common set of tools is typically used to share information during a service event, including: email, phone, or a webpage with service status.

The challenge during an unplanned event is keeping customers up to date in a timely manner. Drafting update messages, gaining necessary approvals, and distributing the update messaging across all forums requires coordination. Asking the individual(s) responsible for recovering during an event to also create the messaging extends mean time to recovery.

The majority of time in messaging updates to customers is spent iterating on a message in order for it to meet expectations of business leadership or teams responsible for external messaging. The result is that messages to be sent to customers have been known to be queued up in a "system" and the process to get messages to customers can take anywhere from minutes, hours, or days to complete.

SUMMARY

In an embodiment, a method of providing a distributed messaging system to aggregate particular types of messages regarding a client from customers of said client and for generating response and informational messages to the customers is provided. The method is performed in a distributed system comprising one or more processors executing computer instructions and one or more non-transitory computer readable media with computer executable instructions stored thereon executed by the one or more processors to provide the method. The method comprises the steps of: receiving and securely storing client account credentials of the client for a group of client determined user accounts comprising predetermined ones of social media and email accounts of the client; utilizing the client account credentials to access the user accounts; capturing all customer messages received at the user accounts; filtering all the captured messages for predetermined keywords; aggregating the filtered customer messages in a database; and determining trust and validity of the filtered customer messages.

The embodiment may further comprise storing only the filtered customer messages comprising the keywords in the database and not storing messages not comprising the keywords.

The embodiment may further comprise selecting keywords to be related to issues with respect to service provided by the client to the customers.

The embodiment may further comprise identifying service issues from the filtered customer messages.

The embodiment may further comprise generating an alert to the client for each new identified service issue.

The embodiment may further comprise automatically generating acknowledgement responses to customers.

The embodiment may further comprise determining whether one or more of the filtered customer messages relate to a corresponding service issue.

The embodiment may further comprise generating a timeline of service issues.

The embodiment may further comprise providing the client with a dedicated web site accessible only by the client; generating a client dashboard viewable only by the client at the dedicated web site; and displaying the timeline on the client dashboard.

The embodiment may further comprise displaying a status of each of the issues on the client dashboard.

The embodiment may further comprise providing the client with a customer dashboard accessible by the customers. The customer dashboard provides status information for the issues.

The embodiment may further comprise providing a message database comprising client specific templates of status messages; responding to a client request to generate a status message pertaining to a service issue by selecting one of the templates of status messages; displaying on a web page of said dedicated web site the selected one template status message; and generating a status message from the selected one template status message.

The embodiment may further comprise storing predetermined approval chains of individuals having authorization to approve each status message and corresponding contact data for the individuals.

The embodiment may further comprise automatically sending each status message for approval to each of the individuals in an approval chain of individuals.

The embodiment may further comprise providing each of the individuals in the approval chain an opportunity to modify each status message prior to approving the status message.

The embodiment may further comprise generating an audit file for each approved status message. Each audit file comprises a history of approval of the corresponding status message.

The embodiment may further comprise storing one or more target groups and mailing lists created by the client.

The embodiment may further comprise selecting one or more target groups and mailing lists to receive each approved status message approved by the approval chain of individuals.

The embodiment may further comprise automatically publishing each approved status message to one or more target groups and mailing lists.

The embodiment may further comprise automatically adjusting each approved message to meet limitations of specific ones of the predetermined ones of social media and email accounts.

The embodiment may further comprise utilizing client account credentials to access user accounts for predetermined ones of social media and email accounts of the client for corresponding target groups, and publishing each approved status message to the accessed user accounts.

The embodiment may further comprise analyzing keyword context in each filtered message to associate a severity value to said filtered message; generating an alert when the severity value exceeds a predetermined threshold; and sending the alert to the client.

The embodiment may further comprise storing client message templates; and selecting a message template to initiate a process to provide an informational message to customers in response to each of the service issues.

The process may comprise providing an approval workflow for each informational message; and iterating each informational message through the approval workflow to obtain an approved informational message.

The embodiment may further comprise generating an audit file for each approved informational message. Each audit file comprises a history of approvals and iterations of the informational message.

The embodiment may further comprise encrypting the client credentials and storing the encrypted client credentials in a secure database.

The embodiment may further comprise providing credential status notifications to the client.

The embodiment may further comprise automatically retrieving appropriate ones of the client credentials to publish the informational message via the client determined ones of the predetermined ones of social media and email accounts without requiring an interactive client log-on.

A distributed messaging system to aggregate particular types of messages regarding a client from customers of said client and for generating response and informational messages to the customers is provided. The distributed system comprises one or more processors executing computer instructions and one or more non-transitory computer readable media with computer executable instructions stored thereon executed by the one or more processors to provide the method. The system comprises memory for receiving and securely storing client account credentials of the client for a group of client determined user accounts comprising predetermined ones of social media and email accounts of the client. The one or more processors utilize the client account credentials to access the user accounts. The one or more processors capture all customer messages received at the user accounts and filter all the captured messages for predetermined keywords. The system comprises a database and the one or more processors aggregate the filtered customer messages in the database. The one or more processors determine trust and validity of the filtered customer messages.

The distributed messaging system may further comprise the one or more processors storing only the filtered customer messages comprising the keywords in the database and not storing messages not comprising the keywords.

The distributed messaging system may further comprise the keywords being selected to be related to issues with respect to service provided by the client to the customers.

The distributed messaging system may further comprise the one or more processors identifying service issues from the filtered customer messages.

The distributed messaging system may further comprise the one or more processors generating an alert to the client for each new identified service issue.

The distributed messaging system may further comprise the one or more processors automatically generating acknowledgement responses to customers.

The distributed messaging system may further comprise the one or more processors determining whether one or more of the filtered customer messages relate to a corresponding service issue.

The distributed messaging system may further comprise the one or more processors generating a timeline of the service issues.

The distributed messaging system may further comprise the one or more processors providing the client with a dedicated web site accessible only by the client; generating a client dashboard viewable only by the client at the dedicated web site; and displaying the timeline on the client dashboard.

The distributed messaging system may further comprise the one or more processors displaying a status of each of the issues on the client dashboard.

The distributed messaging system may further comprise the one or more processors providing the client with a customer dashboard accessible by the customers. The customer dashboard provides status information for the issues.

The distributed messaging system may further comprise a message database comprising client specific templates of status messages. The one or more processors respond to a client request to generate a status message pertaining to a service issue by selecting one of the templates of status messages; displaying on a web page of said dedicated web site the selected one template status message; and generating a status message from the selected one template status message.

The distributed messaging system may further comprise memory storing predetermined approval chains of individuals having authorization to approve each status message and corresponding contact data for the individuals.

The distributed messaging system may further comprise the one or more processors automatically sending each status message for approval to each of the individuals in an approval chain of individuals.

The distributed messaging system may further comprise the one or more processors providing each of the individuals in the approval chain an opportunity to modify each status message prior to approving the status message.

The distributed messaging system may further comprise generating the one or more processors an audit file for each approved status message. Each audit file comprises a history of approval of the corresponding status message.

The distributed messaging system may further comprise memory storing one or more target groups and mailing lists created by the client.

The distributed messaging system may further comprise the one or more processors receiving a selection of one or more target groups and mailing lists to receive each approved status message approved by the approval chain of individuals.

The distributed messaging system may further comprise the one or more processors automatically publishing each approved status message to said one or more target groups and mailing lists.

The distributed messaging system may further comprise the one or more processors automatically adjusting each approved message to meet limitations of specific ones of the predetermined ones of social media and email accounts.

The distributed messaging system may further comprise the one or more processors utilizing client account credentials to access user accounts for predetermined ones of social media and email accounts of the client for corresponding target groups, and publishing each approved status message to the accessed user accounts.

The distributed messaging system may further comprise the one or more processors analyzing keyword context in each filtered message to associate a severity value to said filtered message; generating an alert when the severity value exceeds a predetermined threshold; and sending the alert to the client.

The distributed messaging system may further comprise a database storing client message templates; and the one or more processors being responsive to a request from the client to select a message template to initiate a process to provide an informational message to customers in response to each of the service issues The distributed messaging system may comprise providing an approval workflow for each informational message. The one or more processors iterate each informational message through the approval workflow to obtain an approved informational message.

The distributed messaging system may further comprise the one or more processors generating an audit file for each approved informational message. Each audit file comprises a history of approvals and iterations of the status message.

The distributed messaging system may further comprise the one or more processors encrypting the client credentials and storing the encrypted client credentials in a secure database.

The distributed messaging system may further comprise the one or more processors providing credential status notifications to the client.

The distributed messaging system may further comprise the one or more processors automatically retrieving appropriate ones of the client credentials to publish the informational message via the client determined ones of the predetermined ones of social media and email accounts without requiring an interactive client log-on.

BRIEF DESCRIPTION OF THE DRAWING

The invention will be better understood from a reading of the following detailed description in conjunction with the attached drawing figures in which like reference designations are used to designate like elements and in which.

DETAILED DESCRIPTION

Figure 1:
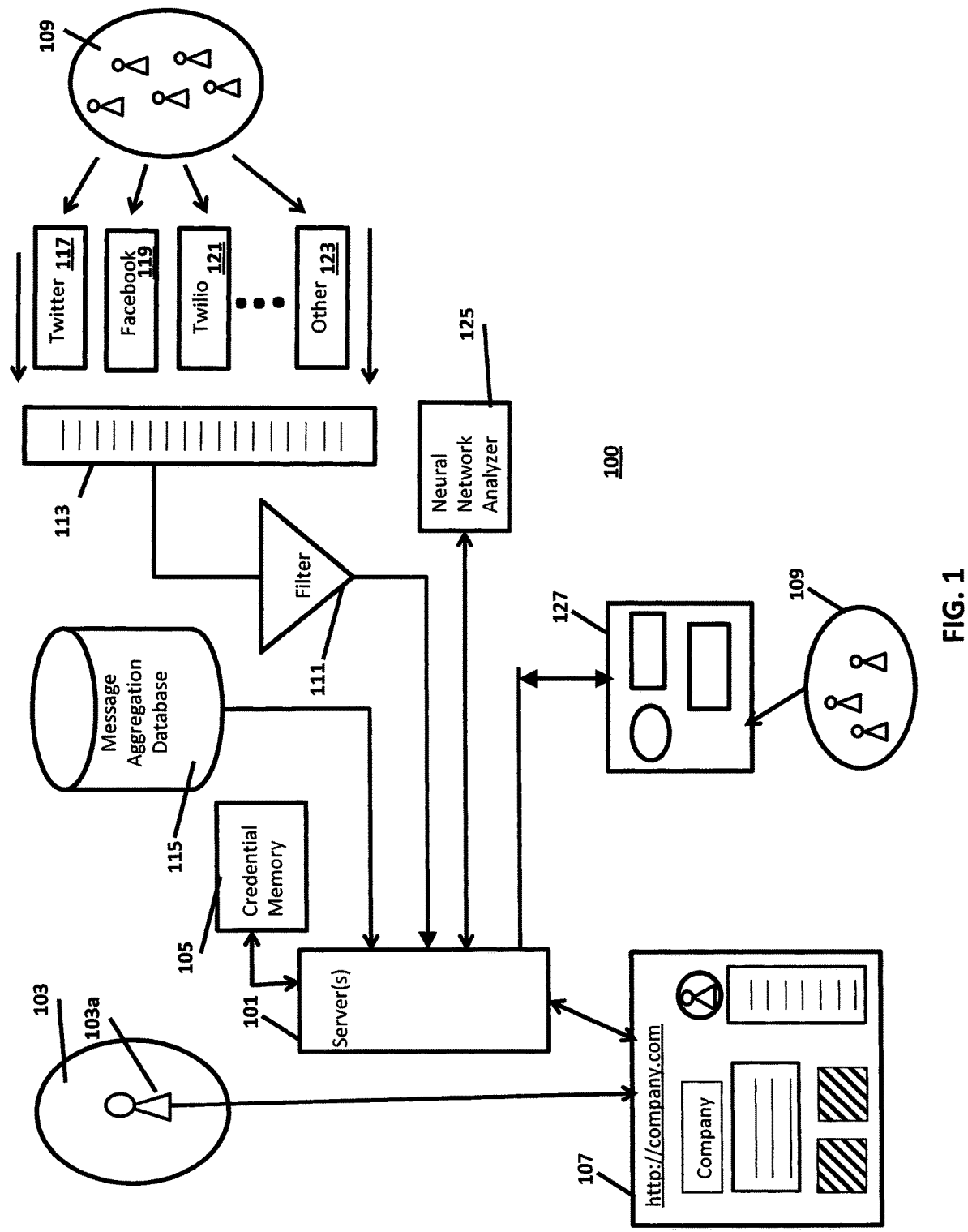
FIG. 1 is a block diagram illustrating a portion of an embodiment.

Turning now to FIG. 1, system 100 comprises one or more servers 101 to provide the services described herein. It will be understood by those skilled in the art that the various functions described herein may be hosted on one or more servers 101 that are dedicated to the functions or the server or ones of the servers may be cloud servers. The one or more servers 101 are provided with computer programs that comprise program instructions that when executed by the one or more servers provide the functions and services described herein.

Organizations desiring to utilize the service of system 100 subscribe to the service. Upon subscribing to the service, each organization becomes a client 103 and obtains secure log-on information for a dedicated hosted web site supported by the system 100 and method of the embodiment shown in the drawing figures. The secure log-on may comprise any available secure procedure or processes. The secure log-on may utilize any existing secure log-on procedure such as, for non-limiting example, use of an identification and password, and/or biometric identification for designated client individuals. Because a client 103 may require several individuals to have access to the services, each client 103 may authorize a number of individuals 103a to have access to the services and each authorized individual 103a may have an assigned secure log-on to system 100. In the following descriptions, when access to the services by a client 103 is described, the access may be by any one of the authorized individuals 103a that have secure log on credentials.

In the following description, it will be understood that where reference is made to a client 103 that actions taken may be from an authorized individual 103a and that various authorized individuals 103a may have different access to the services provided by system 100. For example, certain one or ones of individuals 103a may have administrative access to the services provided by system 100 for client 103 and other individuals 103a may have access to message generation.

After an organization subscribes to the service, client 103 is asked to identify all social media accounts upon which it has a presence and client 103 provides its credentials for access to the social media accounts, email and SMS accounts. System 100 stores the client's credentials in a secure credential memory 105. This way, system 100 associates a single client 103 with multiple accounts. Utilizing the credentials 105, system 100 may monitor and have read and write access to all of client 103 social media accounts 117, 119, 121, 123 to which client 103 has access.

Although only four social media accounts 117, 119, 121, 123 are shown, it will be understood by those skilled in the art that the number of social media accounts may be more or less than the ones shown and may include those shown or other social media accounts and may include the email as well as SMS (short message service) text accounts of client 103.

Each client 103 is provided access to a dedicated client web site 107. Client website 107 facilitates informational message drafting, chain approval and iteration, and distribution of informational messaging on a time-sensitive basis to customers 109 to communicate and respond to, for example, identified service issues.

Figure 2:
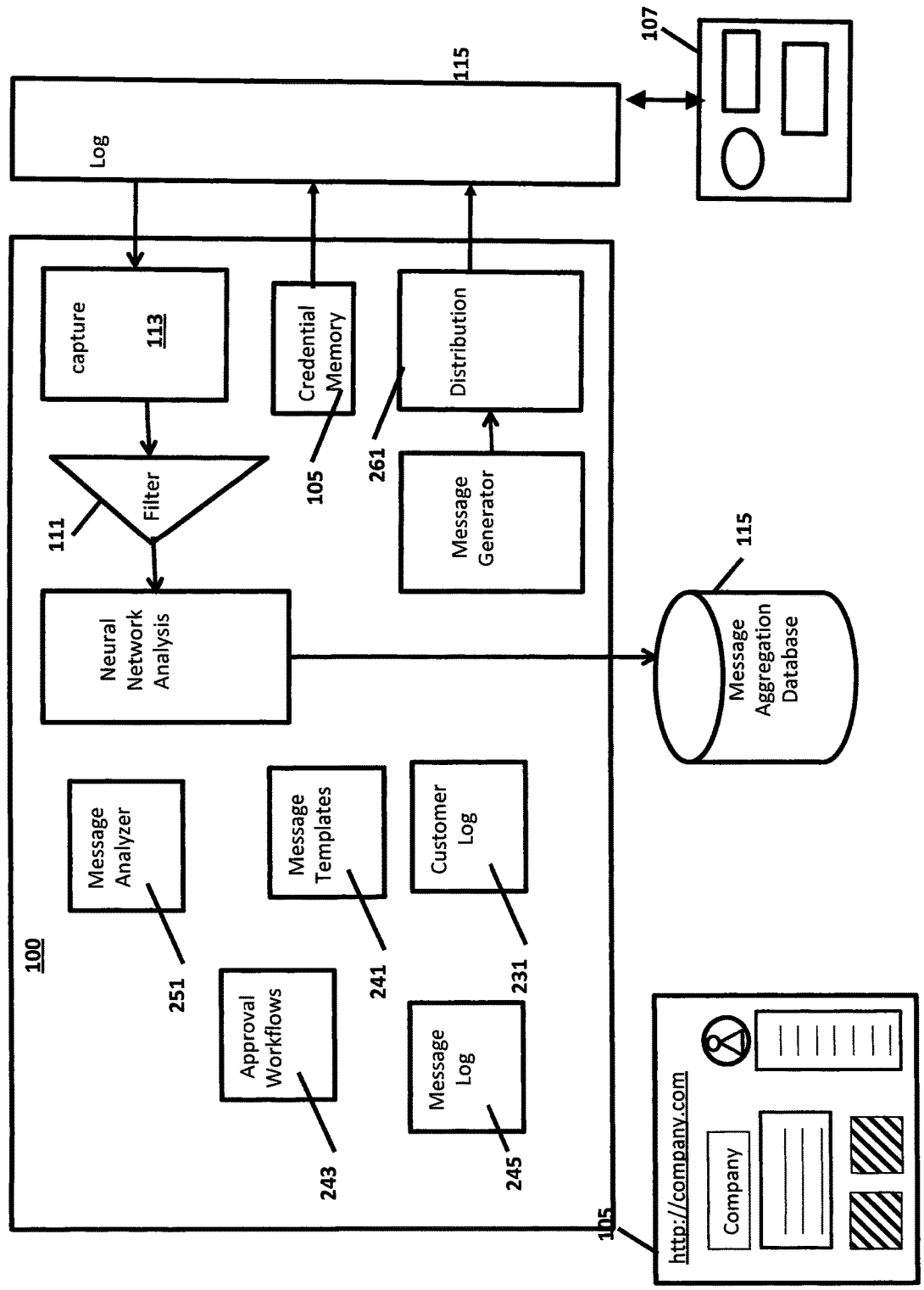
FIG. 2 is a block diagram illustrating further details of the embodiment of FIG. 1.

As shown in FIG. 1, client 103 has a presence on Twitter 117, Facebook 119, Twilio 121 and other social media accounts 123 that are accessible by customers 109 of client 103. System 100 monitors each social media account 117, 119, 121, 123 utilizing the credentials of client 103. System 100 comprises a social feed monitor 113 that captures all messages sent by customers 109 to client 103 via social media accounts 117, 119, 121, 123 for predetermined keywords. Although social feed monitor 113 is shown as a separate entity in FIG. 1, it will be understood by those skilled in the art that social feed monitor 113 may comprise computer program instructions executed by one or more servers 101 as shown in FIG. 2. If a message comprises one or more predetermined keywords, the message is captured. The keywords of interest typically pertain to service issues. The determination of messages containing keywords of interest is performed by filter 111. Filter 111 is provided by computer program instructions executed by one or more servers 101.

The captured and filtered social media messages are sent to and stored in message aggregation database 115. One or more servers 101 further comprises a neural network analyser 125 in the form of computer instructions that perform neural network analysis on the captured social media messages and aggregate the messages comprising predetermined keywords. Neural network analyzer 125 further utilizes the number of unique message reports and the number of "plus 1" reports for a reported service issue to determine trust and validity of a message reporter and reported service issue.

Client web site 107 provides to client 103 an internal social network health dashboard as described in detail herein below that displays aggregated visualizations of activity based on the predetermined keywords. Clients can customize what is displayed on customer dashboard.

In addition, a customer dashboard 127 or web page is provided for client 103. Customer dashboard 107 may be used to provide status updates to customers 109 as explained herein below.

System 100 provides an Internet web service whereby communications from customers 109 that are directed to a client 103 of the service are captured, aggregated, examined for key words and utilized to identify service issues. For purposes of clarity, the world wide web known as the Internet is not shown in the drawing figures, but those skilled in the art will appreciate and understand that communications from customers 109 are accessed via the Internet and that the web sites, web pages and dashboards are accessible via the Internet.

System 100 aggregates the client's 101 customer 109 comments, inquiries, and complaints from a variety of sources including email and various social media outlets 117, 119, 121, 123 at which the client has a presence.

Turning now to FIG. 2, system 100 is shown in greater detail. As shown in FIG. 2, the various functional blocks may each be hosted on one or more servers 101 and are provided as computer program instructions stored in a non-transitory memory that when executed by the one or more servers or computers causes the one or more servers to perform the associated function.

System 100 utilizes neural network analyzer 125 as a distributed monitoring system to read event timelines and any @ messages to a timeline. For example, a customer 109 might state: "Hey @ CompanyA your service is currently not working for me. Please help!" System 100 comprises a distributed monitoring and data gathering system that captures all social media, email and SMS messages across a customer timeline, and using filter 111 matches given keywords across any events.

Messages captured by social feed monitor 113 having matched keywords as determined by filter 111 are stored in message aggregation database 115. All other messages captured by social feed monitor 113 may be dropped for security purposes (although most of these messages are already generally public messages). Client 103 may give system 100 permission to also read, filter and store private @ messages or what are sometimes also referred to as direct messages (DMs) that contain matched keywords. System 100 also applies the same keyword rules to these direct messages and only keyword matched messages are stored and encrypted for privacy.

Client 103 can add additional keywords that it would like for system 100 to monitor and give visibility across its network of accounts. System 100 uses in-memory stores for fast analysis of recent messages for keywords and then writes "hits" of keywords to message aggregation database 125 that supports millions of writes per minute. In various embodiments, message aggregation database 125 may be supported in the cloud.

One or more servers 101 utilize message generator 201 to automatically acknowledges customer 109 messages 303, 305, 307, 309 and intelligently respond to customers 109 across social streams on social media accounts 117, 119, 121, 123 shown in FIG. 1 by using artificial intelligence (AI). One of more servers 101 utilize message aggregation database 115 and the credentials of client 103 stored in credential memory 105 to access social media accounts 117, 119, 121, 123 to send a response. For example, the message set out above may be replied with: "Thank you for reporting the issue @ UserA. We are currently investigating this report and will respond if we discover any issues on our system."

Figure 3:
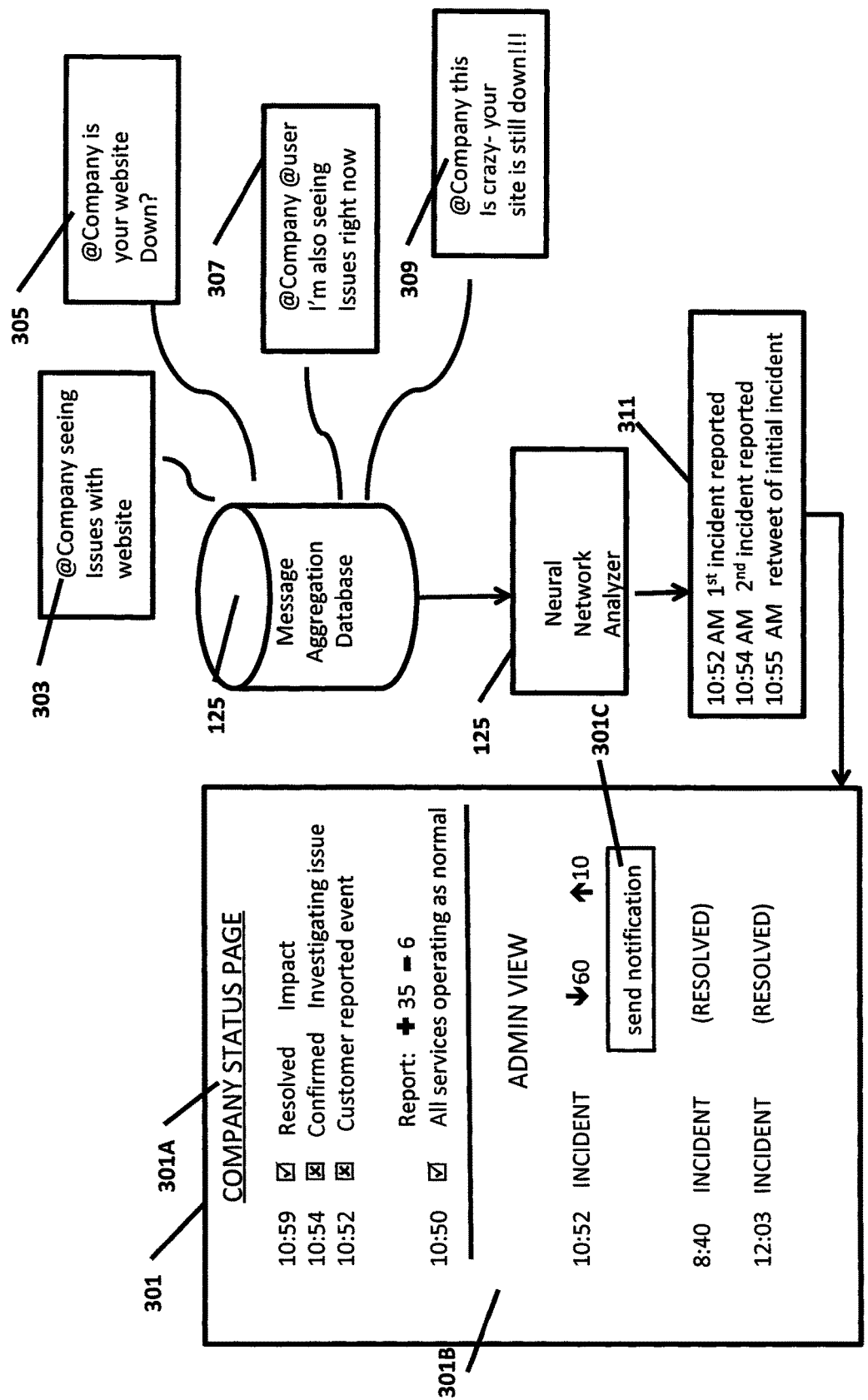
FIG. 3. illustrates a web page of the embodiment of FIG. 1.

System 100 presents service alerts to client 103 via a dashboard 301 shown in FIG. 3 at its dedicated web site 107. Dashboard 301 summarizes service issues aggregated from social media outlets 117, 119, 121, 123, email and SMS.

As shown in FIG. 3, message aggregation database 125 receives and stores in message aggregation database 125 messages 303, 305, 307, 309 all having keywords "issues" and "down". Neural network analysis program 125 shown in FIG. 2 operates on the aggregated messages 303, 305, 307, 309 to determine that two incidents have occurred, i.e., an incident reported at message 303 and a second incident reported at message 305. Neural network analysis program 125 additionally determines that messages 307 is a retweets of the initial incident reports and that message 309 is an outlier because of a time stamp on the message indicating that it is a delayed or late report and is to be ignored. Neural network analysis program 125 generates a timeline 311 of incident reporting.

Dashboard 301 comprises a timeline of incident reporting display portion 301A and a status display portion 301B. Incident reporting display portion 301A includes a listing of current incidents and if an incident is resolved, also displays that the incident is resolved. For unresolved incidents, client 103 has the option of sending a notification to an operations team for action by clicking on send notification icon 301C. In other embodiments, system 100 automatically sends a notification to pre-determined operations team upon a report of an unresolved incident or issue.

Status display portion 301B provides a status timeline that indicates key events and further provides for selecting whether to make the status public on a customer viewable dashboard by checking the status event or to not make the status public on a customer viewable dashboard by "x"ing the status event.

System 100 aggregates reported issues by keyword and provides client 103 with health status dashboard 301 to provide client 103 uses with a real-time sense of what customers 109 are saying about its service status and health.

Internal health status dashboard 301 can be configured to proactively alarm an operations team if certain predetermined thresholds are breached. Client 103 is provided the option of setting the predetermined thresholds. Distributed system 100 captures updates across multiple networked systems, including from any social streams 117, 119, 121, 123 or messages in an email inbox or sms messages shown in FIG. 1.

System 100 keeps count of keyword and source pairs so that this information can be tracked and presented on dashboard 301. A log 231 shown in FIG. 2 is also kept and can be reviewed to see additional details such as identity of customer 109 sender and timestamp. In various embodiments, log 231 may be provided in message aggregation database 115. System 100 also shows keyword hit detail in a real-time graph on dashboard 301 shown in FIG. 3 so that a client operations team can see when the last report was received and determine when customers first started reporting the issue and when recovery occurred. The real time graph is not shown in the drawing figures for purposes of clarity.

Turning back to FIG. 2, system 100, in addition to summarizing service issues aggregated from social media web sites, also provides for drafting, iteration and distribution of time-sensitive information to customers 109 of client 103. System 100 provides pre-defined message templates and examples stored in message template memory 241 for communicating service events and status to customers 109.

By accessing its account, client 103 or its designee 103a may proactively look through pre-defined message templates and examples stored in memory 241 for communicating service events and status to customers 109.

Client 103 may select an existing stored message and copy it or utilize a stored template stored in message templates and examples from template memory 141 to create customized messaging that fits the communication style of client 103. Each customized message may be saved with a unique name and version with message templates and examples stored in memory 241 to be easily found in the future. Using tags and labels client 103 can organize custom templates and messages stored in memory 241 to make them easy to search and find according to its own criteria during an issue event. In other embodiments, system 100 automatically selects a message template for display to client 103. In further embodiments, system 100 automatically publishes the automatically selected message template. In yet additional further embodiments, selected ones of messages stored as message templates are automatically selected and published based upon the types of issue events that are detected by keywords.

After message templates are created, approval workflows and contact information is stored in secure storage 243.

Figure 4:
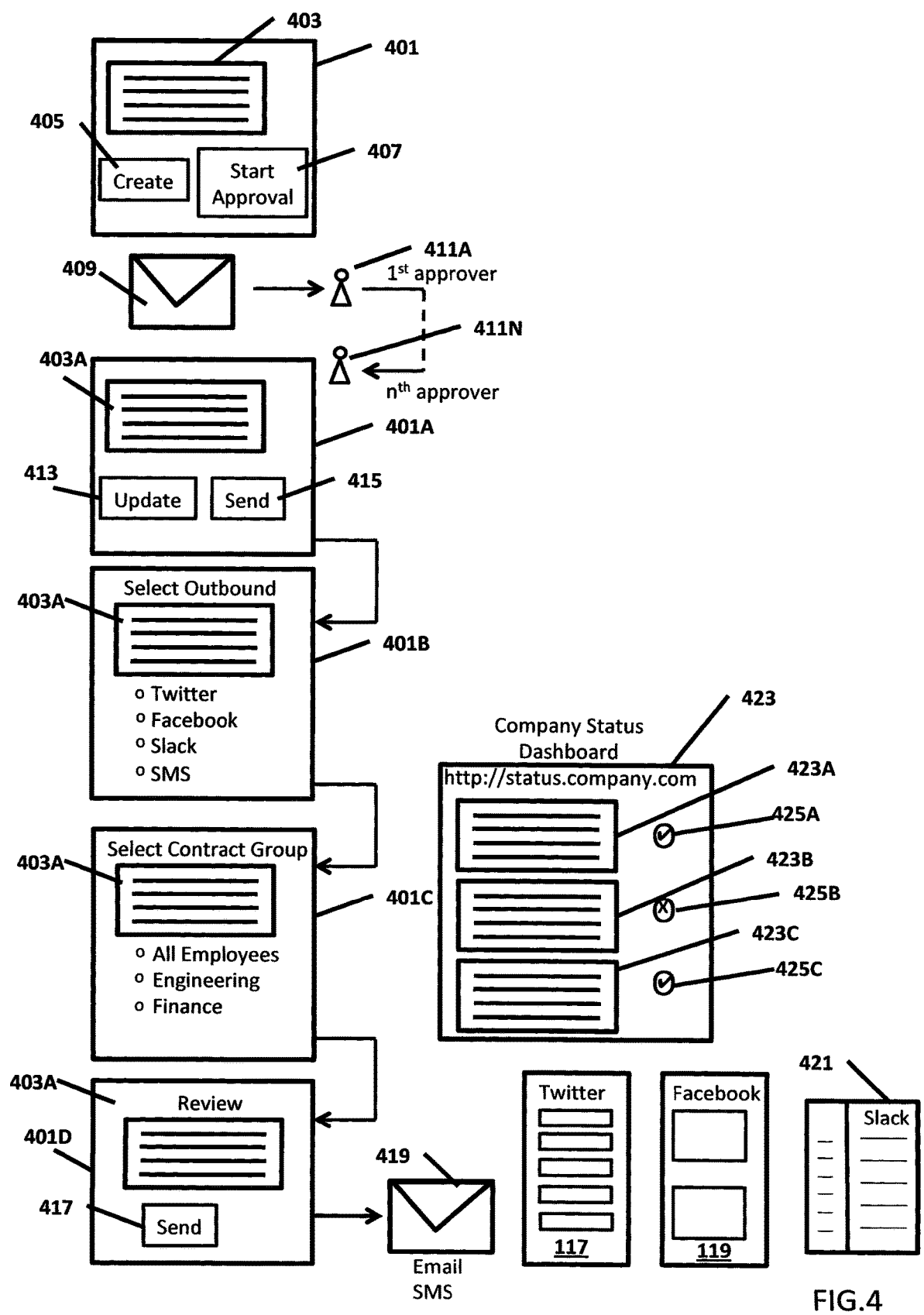
FIG. 4 is a functional diagram of a portion of embodiment of FIG. 1.

As will be explained with the benefit of FIG. 4 below, client 103 can identify and add individuals as message approvers to its account by adding each approver's corporate email or phone number to it's account. System 100 stores each approver's contact information in secure storage 329. Within the account of client 103, individuals or groups of individuals may be designated as Level 1, Level 2, or Level 3 approvers.

Client 103 may also configure what level approval messages must receive prior to the messages being ready to be sent to customers 109 by system 100. For standard messaging, client 103 can have standard messaging pre-approved, so that authorized designees 103a of client 103 can quickly log-on and send a message if needed during an event. The approval authorization system of system 100 ensures that only approved messages can be sent.

System 100 allows for easy creation of real-time messaging during an event. Client 103 or a designee 103a may log-on to its account to create a new message, assign the approval workflow, and the group to which the new message should be sent. System 101 will automatically notify designated approvers via email and text that they have a critical message pending their approval.

If some approvers in the workflow can not be found or are not responsive for predetermined periods of time, system 100 will notify client designee 103a and client designee 103a can request a one-time code from system 100 to bypass approvals from, for example, Level 3 approvers.

A client designee 103a does not need to know, in advance, who needs to approve a given message. System 100 automatically matches approval workflows to each mailing list. A client designee 103a identifies a group of customers 109 to whom the message is to be sent and system 100 generates all internal approvals and then, upon receipt of all internal approvals, automatically notifies the customers.

System 100 as shown in FIG. 2 further comprises a logging system 245 to track all message creation, messaging updates, approvals, and sending of messages for audit trail purposes.

When a client designee 103a logs in to system 100, client designee 103a is presented with client account home page.

From client 103 home page, a client designee 103a can choose to create a new message. When creation of a new message is selected, client designee 103a is presented with web page 401 shown in FIG. 4. This new message is stored encapsulated in JSON (JavaScript Object Notation) and saved to message template store 241 shown in FIG. 2. In some embodiments the new message is written to a cloud storage system.

Client designee 103a may utilize a template or example to create message 403 by clicking on a create icon 405. Once client designee 103a has created message 403a, the approval process is initiated by clicking approval icon 407. After approval icon 407 is clicked, system 100 automatically determines the approval chain necessary for the type of message and an email or sms text 309 is sent to each of the approvers 411A . . . 411N in sequence. Each approver 411A . . . 411N has an opportunity to either approve the message as is or to make modifications to message 403 and update the message by clicking on icon 413 and modifying the message to message 403A. After each approval is completed, the approval process is repeated for each approver 411A . . . 411N. When the last approver 411N in the approval chain has approved message 403 in its original form or as modified message 403A, last approver 411N clicks send icon 415. Upon clicking send icon 415, web page 401B is presented to client designee 103A and client designee 103A selects to which social media or email accounts message 403A is to be sent. Then, screen 401C is presented to client 103A and one or more contact list mailing groups may be selected to receive message 403A. At screen 401D, message 403A is presented for final review and icon 417 may be clicked to send message 403A to designated email and sms 419 accounts, social network accounts 117, 119, 421.

System 100 also provides updates viewable via company status dashboard 423. The updates viewable comprise recent sent messages 423A, 423B, 423C and permit clicking on status buttons 425A, 425B, 425C for each message 423A, 423B, 423C to indicate that the underlying service event is resolved, or "x"ing the status buttons 425A, 425B, 425C to indicate that the underlying service event is still pending.

System 100 tracks a message history using a blockchain system that ensures the messages history is append-only, immutable, and messages are properly ordered to make sure there are no accidental regressions to messaging.

System 100 identifies all the public social media forums or systems that need to be updated when a new service event message needs to be distributed. System 100 utilizes account owner credentials for social media, deploys an update or configuration change for a public website or dashboard 107, and repeats this process multiple times during a longer-impact event or when the service recovers. System 100 permits a client 103 to configure its social media accounts 117, 119, 121, 123 within the profile of client 103 on system 100. When client 103 approves a message to be distributed, the message is sent via email blast, sms, and updates to social media accounts 117, 119, 121, 123.

Client 103 has the option to choose whether or not to have a public website or dashboard 107 hosted by system 100. If client 103 chooses to have system 100 host public dashboard 107, dashboard 107 will also be actively updated real-time when a notification is approved.

By having system 100 be the central manager for event notifications consistent updates are provided across all social media forums where client 103 has a presence. Thus, updates are shared in a timely manner across all mediums that customers 109 may check.

By utilizing system 100 to host service dashboard 107, rather than having a service dashboard being an add-on service within an existing service infrastructure of client 103, this feature is protected from being affected by a localized service outage.

Although not shown as such in the drawing figures for purposes of clarity, system 100 is a highly available and replicated infrastructure, including the ability to run across multi-geographical locations, to ensure a 100% uptime guarantee.

Turning back to FIG. 2, system 100 includes a message analyzer 251 to adaptively analyze each message prepared prior to publication. Message analyzer, takes into account text limitations of connected social media accounts 117, 119, 121, 123, and uses an AI (artificial intelligence) engine to update messaging to ensure fitting within any character limitations of the various social media accounts 117, 119, 121, 123.

For example, a message that states: "The CompanyA team is currently investigating a reported issue with our email and document editing services affecting some customers in certain parts of the Eastern US region. Based on reports, it appears that the issue started around 4 pm ET today. As we understand the root cause and more information is made available, we will update affected customers." would be updated to something like the following to fit within the Twitter or SMS character limits: "We are currently investigating a reported issue with our services affecting customers in the Eastern US region. As more information is made available, we will update affected customers."

Turning back to FIG. 2, system 100 includes a distribution engine 261 that integrates with commonly used communication systems such as, for example, Twitter, Facebook, Tumblr, Slack, and Twilio. Based on how a message is configured to be sent, system 100 correlates the correct sub-account details and queues the message for distribution. For example, if the message is only being sent to Twitter, system 100 uses encrypted and stored client Twitter account details to publish the message to Twitter. If a message is designed to be sent to large numbers of customers via email or SMS, system 100 uses a message queuing system to author a message to each individual email or phone number.

The above described multi-messaging formatted distributed system 100, in one embodiment is a cloud based server tool that allows each subscriber 103 to set priorities on message types (for example, text over email), view audit logs for all sent messages, and view the depth of any queue to see when all customers have been notified. In the event of an emergency, an abort call can be issued and messages remaining in the queue will be flushed without being sent.

The embodiments shown and described herein provide a web service that enables our clients to draft, iterate, and distribute time-sensitive information to their customers.

The embodiments enable clients to monitor their social streams for keywords, and provide tools to engage with, and respond to, customers across various platforms.

The embodiments provide artificially intelligent (AI) computer aided responses to customers that are reporting events or service issues.

Through outlined use of the system and services of the embodiments guidance on customer engagement best practices is provided during operational events.

The timely communication to customers during operational events earns trust, reduces customer frustration. In addition, the system and methods of the embodiments streamline communications draft, iteration, and approval phases of communication.

The storing of pre-approved messaging and use of templates to reduces TTC (time to create) and TTR (time to respond) to customers. The use of message templates further helps to ensure that messaging is coherent, well-written, remains on-brand;

The use of automated approval workflows accommodates separate core responsibilities such as engineering and marketing).

The various embodiments simplify publishing of outbound communication across multiple platforms, e.g., web, social, sms, etc.

The various embodiments connect directly with impacted customers through personal dashboards.

The various embodiments reduce TTD (time to discover) customer impacting events with proactive monitoring of customer feedback forums.

The various embodiments acknowledge reported issues quickly with AI responders allowing fast, smart responses without needing a 24×7 operations staff.

The particular language used in the specification has been principally selected for readability and instructional purposes, and it may not have been selected to delineate or circumscribe the inventive subject matter. It is intended that the invention not be limited in scope to the various embodiments shown and described herein. Those skilled in the art will appreciate that changes and modifications to the embodiments may be made without departing from the spirit or scope of the invention. It is intended that the invention be limited in scope only by the claims appended hereto.

What is claimed is:

1. A method of providing a distributed messaging system for aggregating particular types of messages regarding a client from customers of said client and for generating response and status messages to said customers, said method performed in a distributed system comprising one or more processors executing computer instructions and one or more non-transitory computer readable medium with computer executable instructions stored thereon executed by said one or more processors to provide said method, said method comprising:

receiving and securely storing client account credentials of said client for a group of client determined user accounts comprising predetermined ones of social media and email accounts of said client;

utilizing said client account credentials to access said user accounts;

capturing all customer messages received at said user accounts;

filtering all said customer messages for predetermined keywords;

aggregating said filtered customer messages in a database;

utilizing neural network analysis to determine trust and validity of said filtered customer messages;

storing only said filtered customer messages comprising said keywords in said database and not storing said customer messages that do not comprise said keywords;

selecting said keywords to be related to issues with respect to service provided by said client to said customers;

identifying service issues from said filtered customer messages;

generating a timeline of said service issues;
providing said client with a dedicated web site accessible only by said client;
generating a client dashboard viewable only by said client at said dedicated web site; and
displaying said timeline on said client dashboard;
providing a status message database comprising client specific templates of status messages;
responding to a client request to generate a status message pertaining to a service issue by selecting one of said templates of status messages;
displaying on a web page of said dedicated web site said selected one template status message;
generating a status message from said selected one template status message;
storing predetermined approval chains of individuals having authorization to approve each status message and corresponding contact for said individuals.

2. The method in accordance with claim 1, comprising:
automatically sending each status message for approval to each of said individuals in an approval chain of individuals.

3. The method in accordance with claim 2, comprising:
providing each of said individuals in said approval chain of individuals an opportunity to modify said each said status message prior to approving said status message.

4. The method in accordance with claim 3, comprising:
storing an audit file for each said approved status message, each said audit file comprising a history of approval of said status message.

5. The method in accordance with claim 3, comprising:
storing one or more target groups and mailing lists created by said client.

6. The method in accordance with claim 5, comprising:
selecting one or more target groups and mailing lists to receive each approved status message approved by said approval chain of individuals.

7. The method in accordance with claim 6, comprising:
automatically publishing each approved status message to said one or more target groups and mailing lists.

8. The method in accordance with claim 7, comprising:
automatically adjusting each said approved message to meet limitations of specific ones of said predetermined ones of social media and email accounts.

9. The method in accordance with claim 6, comprising:
utilizing said client account credentials to access said user accounts for predetermined ones of social media and email accounts of said client for said corresponding target groups of customers; and
publishing each said approved status message to said accessed user accounts.

10. A method of providing a distributed messaging system for aggregating particular types of messages regarding a client from customers of said client and for generating response and status messages to said customers, said method performed in a distributed system comprising one or more processors executing computer instructions and one or more non-transitory computer readable medium with computer executable instructions stored thereon executed by said one or more processors to provide said method, said method comprising:
receiving and securely storing client account credentials of said client for a group of client determined user accounts comprising predetermined ones of social media and email accounts of said client;
utilizing said client account credentials to access said user accounts;
capturing all customer messages received at said user accounts;
filtering all said customer messages for predetermined keywords;
aggregating said filtered customer messages in a database; and
utilizing neural network analysis to determine trust and validity of said filtered customer messages;
storing only said filtered customer messages comprising said keywords in said database and not storing said customer messages that do not comprise one or more of said keywords;
selecting said keywords to be related to issues with respect to service provided by said client to said customers;
identifying service issues from said filtered customer messages;
analyzing keyword context in each filtered message to associate a severity value to said filtered message;
generating an alert when said severity value exceeds a predetermined threshold;
sending said alert to said client;
storing client message templates;
selecting a message template to initiate a process to provide an informational message to said customers in response to each of said service issues;
said process comprising providing an approval workflow for each said informational message; and
iterating each informational message through said approval workflow to obtain an approved informational message.

11. The method in accordance with claim 10, comprising:
generating an audit file for each said approved informational message, each said audit file comprising a history of approvals and iterations of said status message.

12. The method in accordance with claim 10, comprising:
storing one or more target groups and mailing lists created by said client.

13. The method in accordance with claim 12, comprising:
selecting one or more target groups and mailing lists by said client to receive each approved informational message.

14. The method in accordance with claim 13, comprising:
automatically publishing each approved informational message to said one or more target groups and mailing lists.

15. The method in accordance with claim 13, comprising:
automatically adjusting each said approved informational message to meet limitations of specific ones of said predetermined ones of social media.

16. The method in accordance with claim 15, comprising:
automatically publishing said approved informational message and said adjusted informational message to said predetermined ones of social media and email accounts.

17. The method in accordance with claim 16, comprising:
encrypting said client credentials; and
storing said encrypted client credentials in a secure database.

18. The method in accordance with claim 17, comprising:
providing credential status notifications to said client.

19. The method in accordance with claim 17, comprising:
automatically retrieving appropriate ones of said client credentials to publish said informational message via said client determined ones of said predetermined ones of social media and email accounts without requiring an interactive client log-on.

\* \* \* \* \*